US008200703B2

(12) United States Patent  
Sattler et al.

(10) Patent No.: US 8,200,703 B2  
(45) Date of Patent: Jun. 12, 2012

(54) METHOD AND APPARATUS FOR SUPPORTING ACTIVE DOCUMENTS

(75) Inventors: Juergen Sattler, Wiesloch (DE); Hilmar Demant, Karlsdorf (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 564 days.

(21) Appl. No.: 12/210,708

(22) Filed: Sep. 15, 2008

(65) Prior Publication Data

US 2009/0012943 A1    Jan. 8, 2009

Related U.S. Application Data

(63) Continuation of application No. 10/940,770, filed on Sep. 15, 2004, now abandoned.

(60) Provisional application No. 60/588,395, filed on Jul. 16, 2004.

(51) Int. Cl.
    *G06F 7/00* (2006.01)
    *G06F 17/30* (2006.01)
(52) U.S. Cl. ......... 707/793; 707/803; 707/944; 715/221
(58) Field of Classification Search .................. 707/705, 707/758
    See application file for complete search history.

(56) References Cited

U.S. PATENT DOCUMENTS

| | | | | |
|---|---|---|---|---|
| 6,192,381 B1 * | 2/2001 | Stiegemeier et al. | ......... | 715/210 |
| 6,266,058 B1 * | 7/2001 | Meyer | ............. | 715/733 |
| 7,047,253 B1 * | 5/2006 | Murthy et al. | .......... | 1/1 |
| 7,124,354 B1 * | 10/2006 | Ramani et al. | ............. | 715/205 |
| 7,206,998 B2 * | 4/2007 | Pennell et al. | ............. | 715/224 |
| 7,499,914 B2 * | 3/2009 | Diab et al. | ............. | 1/1 |
| 2002/0194034 A1 * | 12/2002 | Mears et al. | ............. | 705/4 |
| 2004/0267595 A1 * | 12/2004 | Woodings et al. | ............. | 705/9 |

OTHER PUBLICATIONS

Root, et al., "Microsoft Web Services Enables Office: A New Developer Framework Links Word, Excel, and Outlook to Back-End Apps," Quick Take, Forrester Research, Inc., May 24, 2004, pp. 1-5.
Microsoft Office Information Bridge Framework, IW New Markets, "Information Bridge Framework: Technical Overview," Jun. 22, 2004, pp. 1-129.

(Continued)

*Primary Examiner* — Kuen Lu  
*Assistant Examiner* — Susan F Rayyan  
(74) *Attorney, Agent, or Firm* — Kenyon & Kenyon LLP

(57) ABSTRACT

A tool is proposed for supporting active documents. In one embodiment, an active document may be opened in an application program executing at a first computer, the active document being in a format recognized by the application program. Data relating to a first active document may be received data at the first computer from a user of the application program, and a search request based on the received data may be sent from the first computer to a second computer that maintains a plurality of data objects. In one embodiment, the application program at the first computer is unable to perform any functions with data objects at the second computer. The first computer may receive information relating to a result of the search request from the second computer and may store the information in the first active document. A request from the user of the application program that the active document be submitted may be received at the first computer, and the active document may be forwarded from the first computer to the second computer. A set of procedures that are pre-defined for this active document may then be performed with the active document at the second computer.

24 Claims, 9 Drawing Sheets

OTHER PUBLICATIONS

Microsoft Office Developer Center, "Smart Tags and Smart Documents," http://msdn.microsoft.com/office, Microsoft Corporation, 2004, pp. 1-2.

Microsoft Office Assistance: "About Smart Tags," http://office.microsoft.com/assistance, Microsoft Corporation, 2004, p. 1.

Microsoft Office Assistance: "Use Smart Tags," http://office.microsoft.com/assistance, Microsoft Corporation, 2004, p. 1.

Microsoft Office Developer Center, "Smart Tags and Smart Documents," http://msdn.microsoft.com/office Microsoft Corporation, 2005, pp. 1-2.

"Microsoft Office Information Bridge Framework," Microsoft Corporation, 2004, pp. 1-2.

Cornell, "Smart Documents Development Overview," Microsoft Corporation, Apr. 2003, pp. 1-28.

Kelly, Overview of Smart Client Applications in the Microsoft Office System, Microsoft Corporation, Oct. 2003, pp. 1-7.

Rice, et al., "Adding an ActiveX Control to a Smart Document," Microsoft Corporation, Dec. 2003, pp. 1-13.

Rice, Simple Sample of a Smart Document in Microsoft Office Word 2003, Microsoft Corporation, Jan. 2004, pp. 1-13.

Microsoft Office 2003 Smart Tag Software Development Kit, "Smart Tag SDK," http://msdn.microsoft.com/library, Microsoft Corporation, 2005, pp. 1-2.

Microsoft Office 2003 Smart Document Software Development Kit, "Microsoft Office 2003 Smart Document," http://msdn.microsoft.com/library, Microsoft Corporation, 2005, pp. 1-2.

Office 2003 Smart Document Software Development Kit, "Smart Documents Overview," http://msdn.microsoft.com/library, Microsoft Corporation, 2003, pp. 1-2.

Office 2003 Smart Documents Software Development Kit, "Introduction to Developing Smart Documents," http://msdn.microsoft.com/library, Microsoft Corporation, 2003, pp. 1-2.

Office 2003 Smart Document Software Development Kit, Introduction to Deploying Smart Documents, http://msdn.microsoft.com/library, Microsoft Corporation, 2005, pp. 1-2.

Office 2003 Smart Document Software Development Kit, "Introduction to the Tutorials," http://msdn.microsoft.com/library, Microsoft Corporation, 2005, pp. 1-2.

"Smart Documents: A Smarter Way to Do Business," http://microsoft.com/office/editions, Microsoft Corporation, Aug. 15, 2003, pp. 1-3.

\* cited by examiner

METHOD AND APPARATUS FOR SUPPORTING ACTIVE DOCUMENTS

CROSS-REFERENCE TO RELATED APPLICATIONS

This is a Continuation application of U.S. patent application Ser. No. 10/940,770, filed Sep. 15, 2004, which claims priority to U.S. Provisional Patent Application Ser. No. 60/588,395, filed Jul. 16, 2004, the contents of which are incorporated herein by reference in their entirety.

BACKGROUND OF THE INVENTION

An application program may be used to perform operations on a document, such as a form, that has predefined types of content. An "active document" is a document that has been configured to facilitate the entry of content into such a document by a user of an application program. For example, an active document may be able to guide a user of a word processing program through the fields in a form that is being processed as a document by that word processing program and may prompt the user to enter certain types of information. The document may later by saved as a completed form by the application program (e.g., the word processing program).

A data object is an item of data that is associated with one or more functions (i.e., operations) that may be performed with that data. One type of data object is a "business object," which would concern a commercial matter. Some examples of data objects may be an order, business partner, quotation, or invoice. In the case of the data object "order," for example, a user may be able to command a computer system to perform functions with the order such as creating a new order, checking the order status, canceling the order, shipping a product that was ordered, displaying information for an order, displaying a list of data objects that are related to the order, etc.

Known active document systems do not allow a user of an application program to associate information from data objects in another application program or system with or into an active document. Accordingly, the present inventors perceive these and other needs in the art.

BRIEF DESCRIPTION OF THE DRAWINGS

FIG. 5 is a screen shot that shows an empty active document with a user inserting a text snippet into the form according to an embodiment of the present invention.

FIG. 6 shows is a screen shot that shows active document with a user performing another search to fill information into the document according to an embodiment of the present invention.

DETAILED DESCRIPTION

Embodiments of the present invention provide methods and apparatus for supporting active documents and allow a user of an application program to associate information from data objects in another application program or system with or into an active document. In some embodiments, an active document being operated on by an application program on a front-end system may be able to search data objects in a back-end system. For example, certain elements displayed in an area in a document may be used to send search requests to the back-end system. In the case of a price quotation document, for example, a user may first search for the customer, then may search for text snippets to be used as an introduction of the document, then may search for products, etc.

In a further embodiment, the active document on the front-end system may be able to retrieve text snippets from the back-end system. This feature may be used to identify and import text that was placed in a common storage area at the time the document was designed. In the case of the price quotation example discussed above, a user may use text snippets as introduction to the document.

In a still further embodiment, the active document on the front-end system may be able to create or modify a data object on the back-end system through the use of guided procedures. Such guided procedures may allow the processing of data in the back-end system. For example, if a user creates a quotation document with a form in an application program at the front-end system, then the data can be transferred to the back-end system to create a data object "quotation" which uses this data. In some embodiments, the user may seamlessly create the back-end system data object from the front-end system without the user having to affirmatively access the back-end system, such as by logging on to the back-end system or executing an application program on the back-end system. For example, the data object may be created by the user selecting a button in the front-end system application program to submit the form to the back-end system. In the example above, the back-end system may create a quotation data object for the customer that is mentioned in the form, and this data object may contain a reference to the products that are listed in the form.

Figure 1:
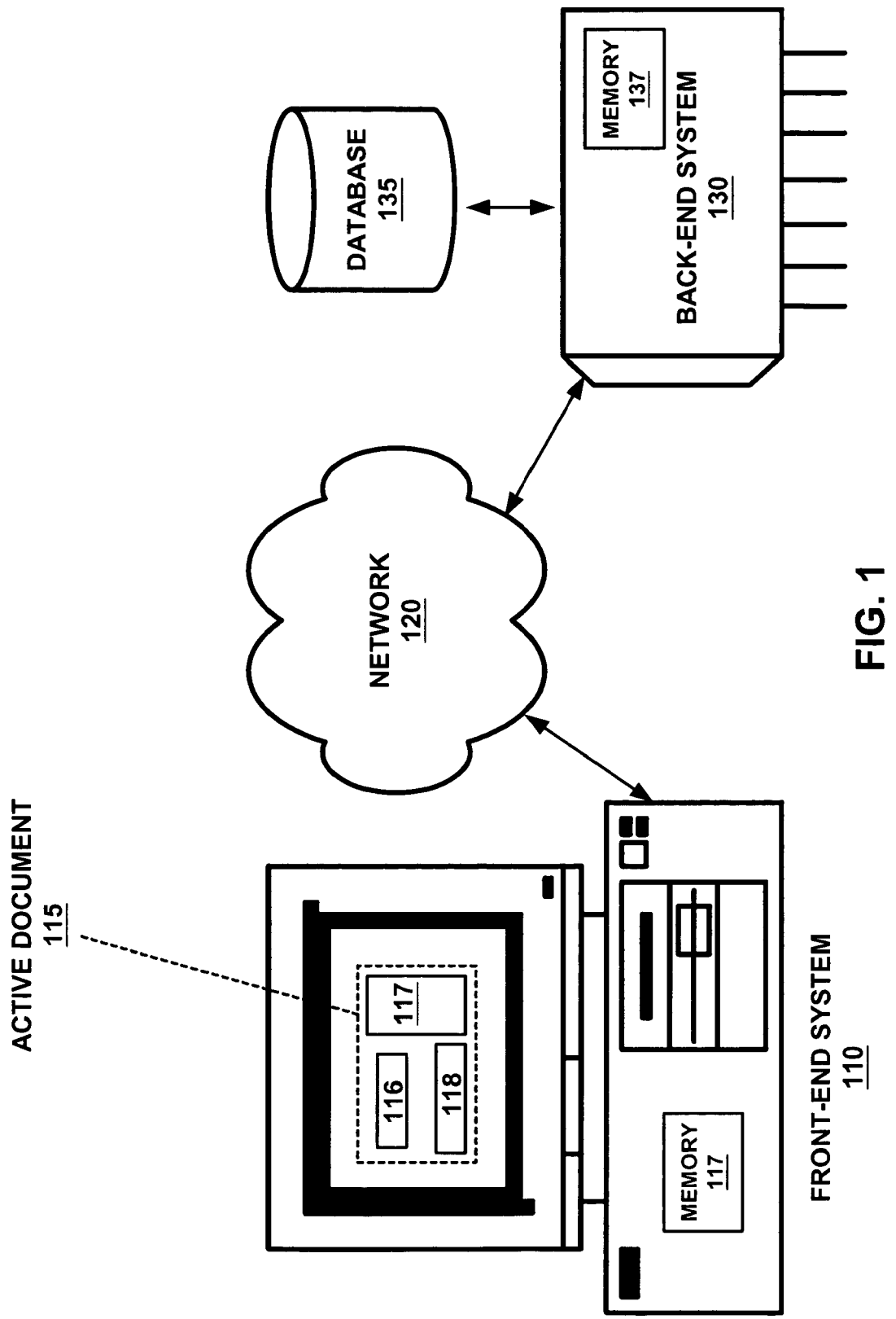
FIG. 1 is a simplified block diagram of a system for supporting active documents according to an embodiment of the present invention.

FIG. 1 is a simplified block diagram of a system for supporting active documents according to an embodiment of the present invention. FIG. 1 shows a front-end system 110, a network 120, a back-end system 130 and a database 135.

Front-end system 110 may be any type of device for running application software, such as for example a personal computer, a terminal, a personal digital assistant (PDA), etc. Network 120 may be any type of network for communicating information, such as a local area network (LAN), wide area network (WAN), the Internet, or an intranet. Back-end system 130 may be a terminal server, mainframe computer, or any type of computer system that services users over network 120. Typically, many front-end systems may be coupled to back-end system 130 through network 120. As shown, back-end system 130 is coupled to database 135, which may be any type of computer readable medium, such as one or more hard disk memories, that stores instructions and data for a knowledge warehouse system that maintains a collection of data to support a decision making process.

As shown in FIG. 1, front-end system 110 is displaying the text of an active document 115, which contains a plurality of fields 116-118. In some embodiments, a user running an application program on front-end system 110 may be prompted to enter information into fields 116-118 on active document 115. Front-end system 110 also contains a memory 117, which may be for example a Random Access Memory (RAM). Memory 117 may be a machine readable medium which stores a computer program (which as is well known comprises a plurality of instructions) that is executable by a computer system, such as front end system 110. A machine readable medium is any medium cable of being read by a machine, such as a floppy disk memory, CD-ROM, etc.

Figure 2:
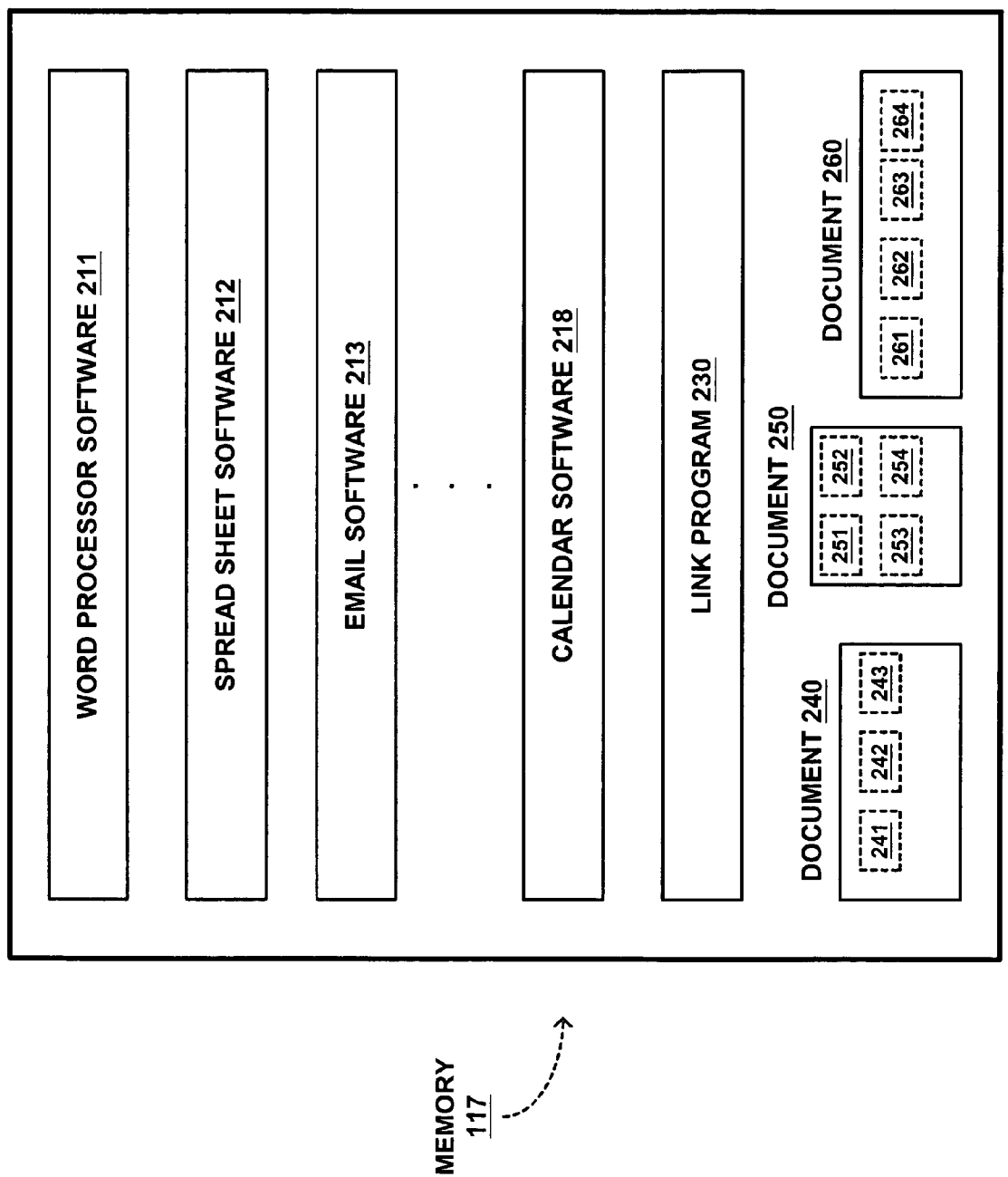
FIG. 2 is a simplified block diagram of a memory that stores programs and active documents according to an embodiment of the present invention.

FIG. 2 is a simplified block diagram of a memory 117 that stores programs and active documents according to an embodiment of the present invention. Memory 117 may store a plurality of application programs 211-218 that may be running on front-end system 110. As shown in FIG. 2, memory 117 stores word processor software 211, spread sheet software 212, email software 213, and calendar software 218, but of course memory 117 may store any other programs that may be running on front-end system 110. As shown in FIG. 2, memory 117 also stores a plurality of documents 240-260, each of which may be documents that may be operated on by application programs 211-218. One or more of the documents 240-260 may be active documents and may contain fields, such as fields 116-118 of FIG. 1. Memory 117 is also shown as storing a link program 230 which may be used to support active documents and may provide an interface between an active document on front-end system 110 and data objects in back-end system 130 according to an embodiment of the present invention.

In some embodiments, and as shown in FIG. 1, front-end system 110 may be adapted to execute one or more application programs (such as programs 211-218) that perform operations on active documents (such as documents 240-260). Back-end system 130 may maintain a database 135 that associates information in the front-end system's documents with data objects. In some embodiments, a single link program on front-end system 110, such as link program 230, may be used to handle all active document related communications with back-end system 130. Configuration information for dynamic links may be created with each initialization of the link program. In some embodiments, back-end system 130 contains business logic, such as actions which can be executed for a specific active document. Thus, back-end system 130 may contain any software that is used to execute a function on a business object. In some embodiments, front-end system 110 does not contain any business logic, and the recognition function as well as the computing that supports actions taken on the data objects may be performed by back-end system 130. In such embodiments, the front-end system cannot perform functions that modify data objects. In some embodiments, changes may not be done until the document is submitted to the back-end system.

Figure 3:
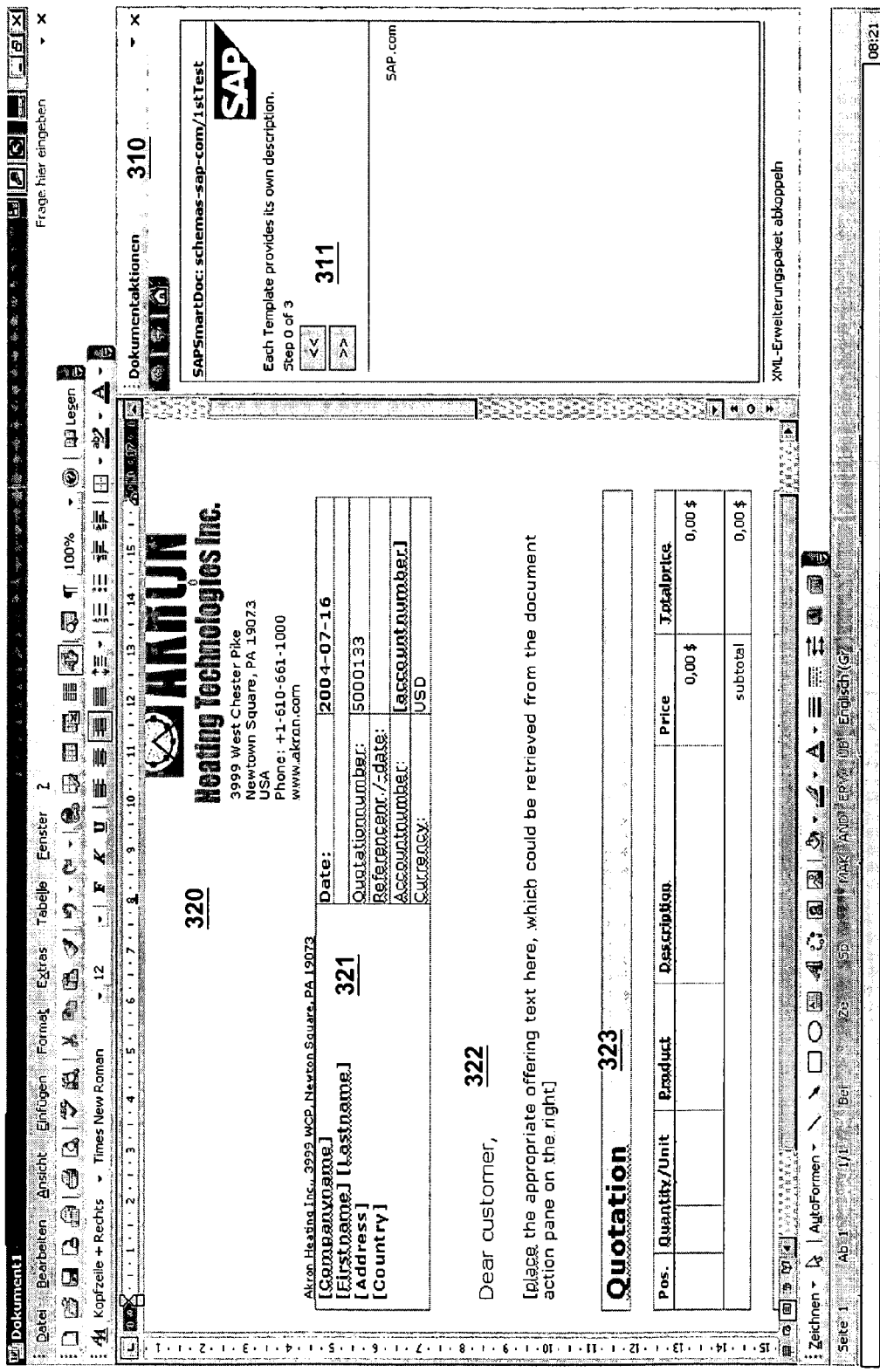
FIG. 3 is a screen shot that shows an active document with an empty form that is being operated on by an application program at the start of the process of being completed according to an embodiment of the present invention.

FIG. 3 is a screen shot that shows an active document 301 with an empty form that is being operated on by an application program at the start of the process of being completed according to an embodiment of the present invention. Active document 301 may be the same as, for example, active document 115 of FIG. 1 and/or documents 240-260 of FIG. 2. Active document 301 may be, for example, a quotation letter that is being sent from a company (here, Akron Heating & Technology, Inc.) to a potential customer. As shown in FIG. 3, document 301 may be being operated on by, for example, a word processor program (such as word processor 211) executing on front-end system 110. Thus, a user may have launched the application program and opened active document 301, which may have caused an active document template to have been opened.

As shown in FIG. 3, active document 301 contains a form 320 and an activity window 310. In this example, form 320 is a blank form with a plurality of fields 321-323 to be completed by a user. In particular, form 320 contains a customer information field 321, a letter text field 322, and a quotation data field 323. In FIG. 3, activity window 310 contains buttons 311 that a user may use to start the active document process to complete the form 320.

Figure 4:
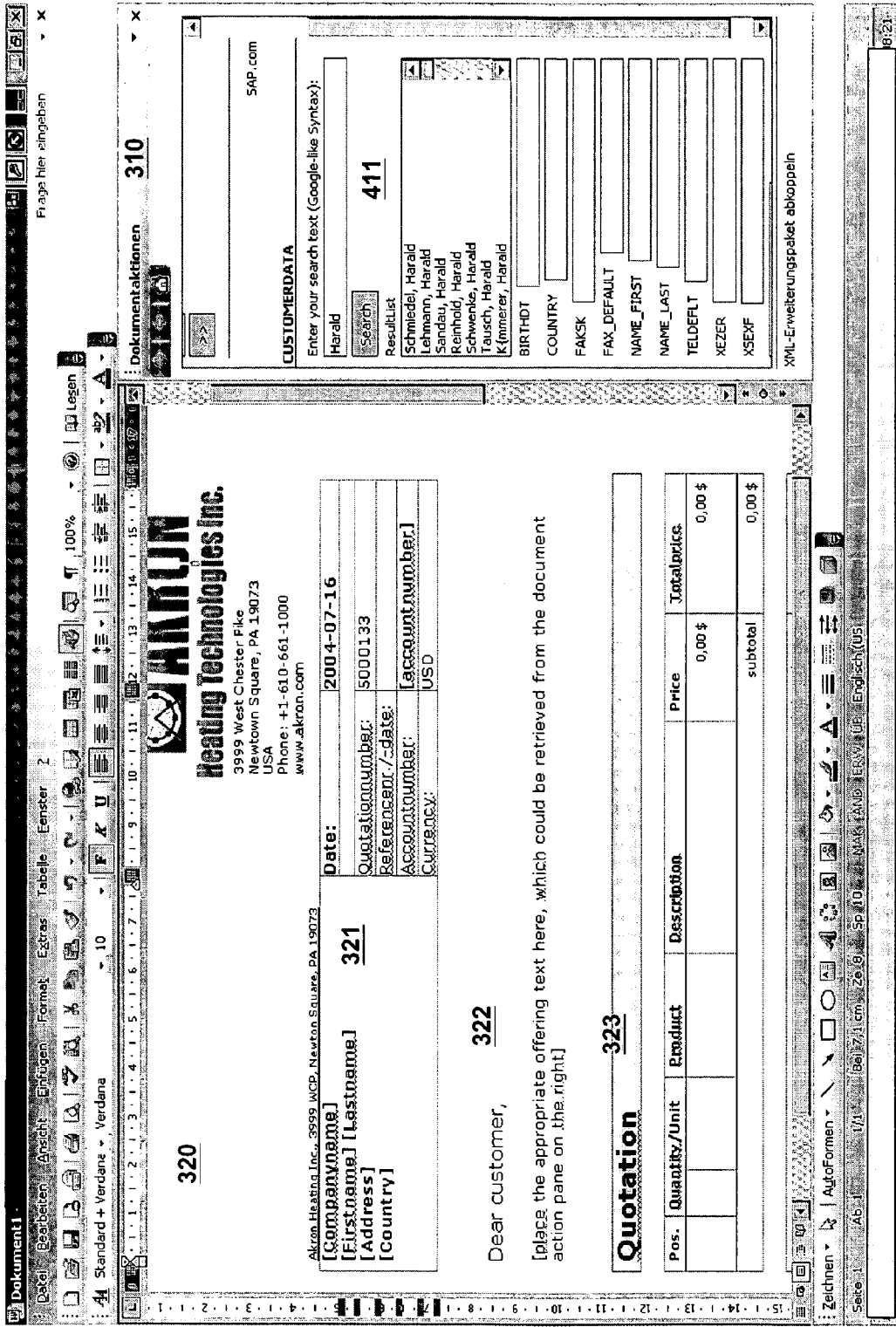
FIG. 4 is a screen shot that shows active document with a user performing a data search according to an embodiment of the present invention.

FIG. 4 is a screen shot that shows active document 301 with a user performing a data search according to an embodiment of the present invention. Active document 301 in FIG. 4 is the same as shown in FIG. 3, but at a later stage of progression. In FIG. 4, activity window 310 contains a search field 411. In this example, a user is searching for a customer with the name "Harald." The link program 320 may cause this search to be sent to the front-end system, and the results may be displayed in search field 411. In this example, a number of customers with the name "Harald" were found, and the user may select one of these customers to be inserted into customer information field 321, as shown in FIG. 5.

Figure 5:
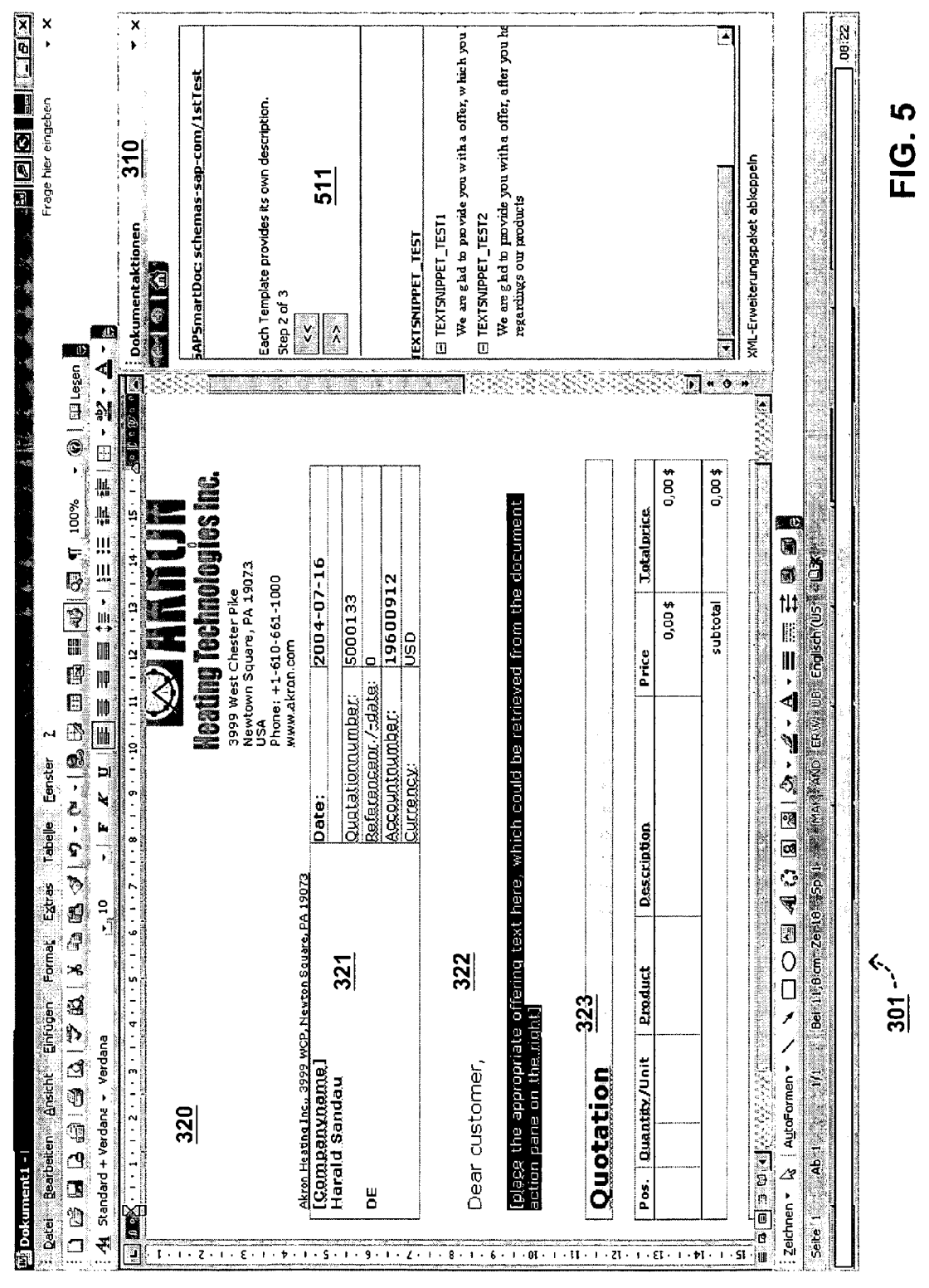

FIG. 5 is a screen shot that shows an empty active document 301 with a user inserting a text snippet (i.e., text string) into the form according to an embodiment of the present invention. Active document 301 in FIG. 5 is the same as shown in FIGS. 3-4, but at a still later stage of progression. In FIG. 5, activity window 310 contains a text snippet field 511. This text snippet field 511 may have been activated when the user selected letter text field 322 in form 320. In this example, text snippet field 511 presents the user with two different text snippets to choose from. In some embodiments, the front-end system may send a request to the back-end system for possible text snippets, and the back-end system may then send the text snippets back to the front-end system. A user may select one of the text snippets, which may be inserted into letter text field 322 after it is selected.

Figure 6:
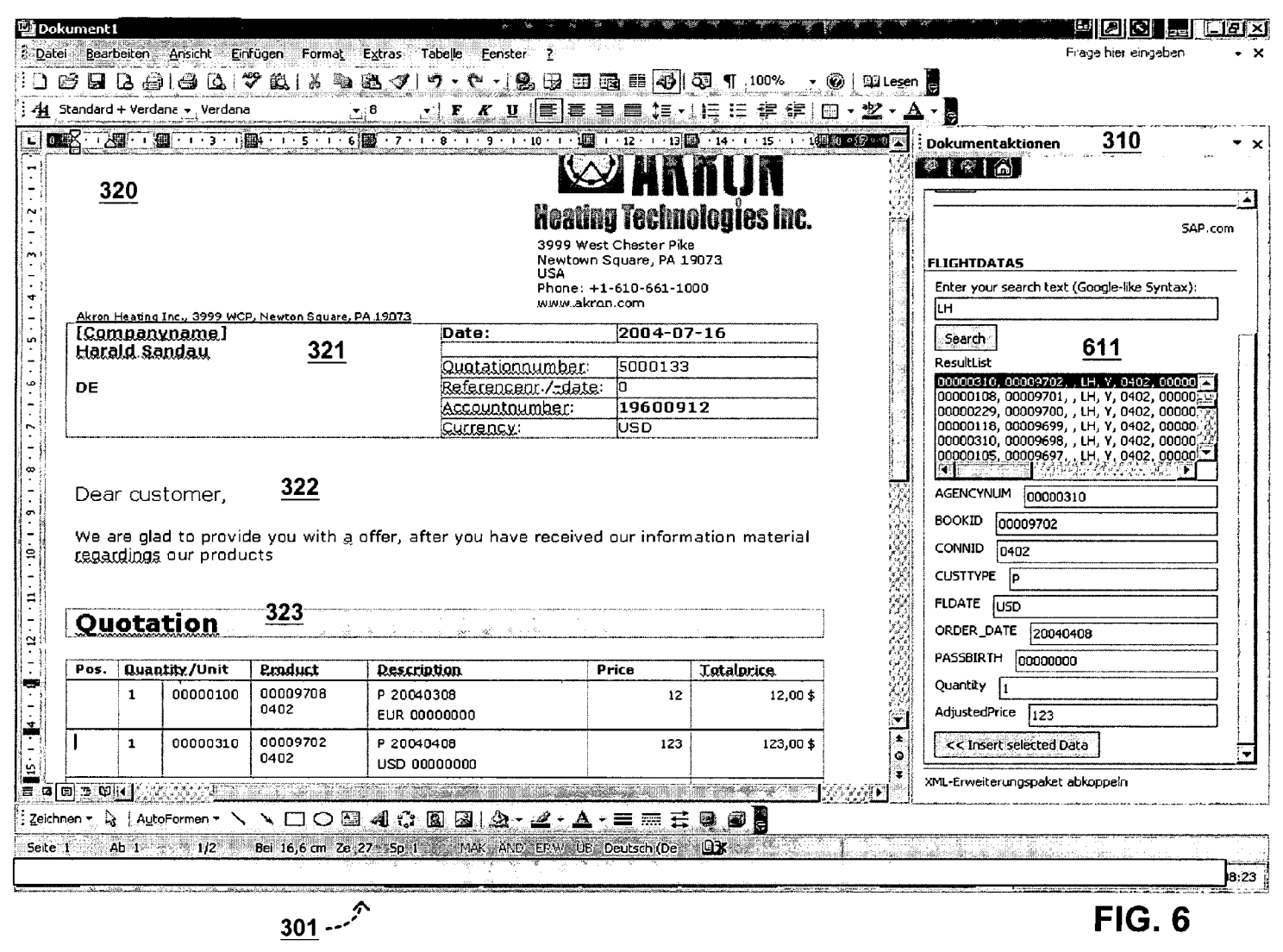

FIG. 6 shows is a screen shot that shows active document 301 with a user performing another search to fill information into the document according to an embodiment of the present invention. Active document 301 in FIG. 6 is the same as shown in FIGS. 3-5, but at a later stage of progression. In FIG. 6, activity window 310 contains a search window 611 which may be used to search for product data, as discussed below with reference to FIG. 4. The product data that is selected by the user may be inserted into quotation field 323 in form 320.

After as user has completed the form, the user may select a button that submits the completed form to the back-end system, which may initiation the guided procedures as discussed above.

Figure 7:
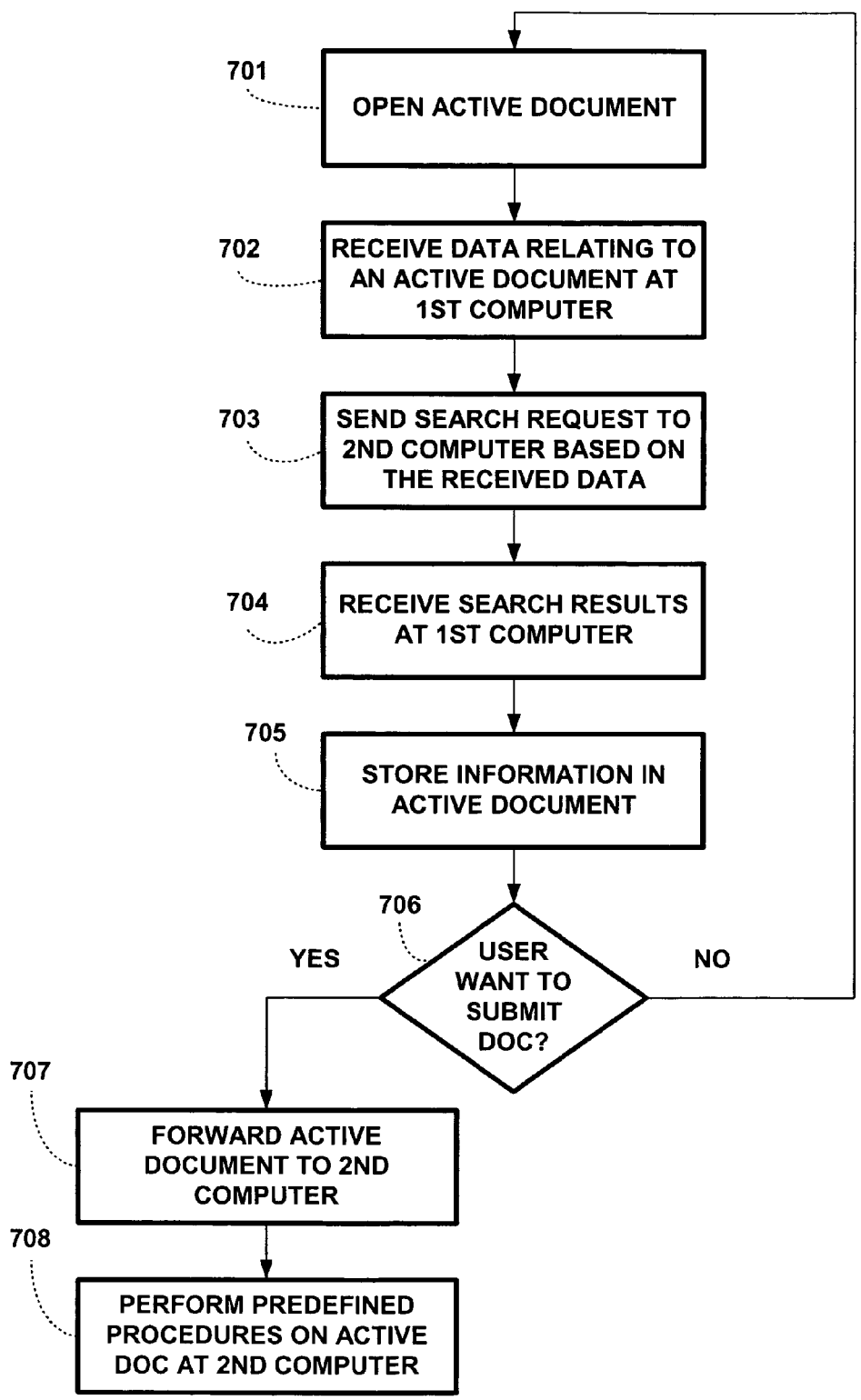
FIG. 7 is a simplified flow chart that shows a method of adding information to an active document as the result of a search of a back-end system according to an embodiment of the present invention.

FIG. 7 is a simplified flow chart that shows a method of adding information to an active document as the result of a search of a back-end system according to an embodiment of the present invention. This method is discussed using the apparatus and functionality shown and addressed with regard to FIGS. 1-6 as an illustration, but of course this method may also be performed with different apparatus, screens, etc. An active document may be open in an application program executing at a first computer (701). The active document may be in a format recognized by the application program and may contain a plurality of fields. For example, active document 115 may be opened by word processing software 211 running on front-end system 110, and this active document may be a quotation document that contains fields such as customer information field 321 of FIG. 3. The user of the application program may provide the first computer with data that relates to an active document (702). For example, the user may input customer data, such as the name "Harald" shown in FIG. 4.

The first computer may send a search request based on the received data to a second computer that maintains a plurality of data objects (703), and the first computer may be unable to perform any functions with data objects at the second computer. For example, front-end system 110 may send a search request for the data "Harald" to back-end system 130, which may contain data objects that are not directly accessible by front-end system 110. In some embodiments, any software to perform functions on such data objects is located at the second computer. The first computer may receive information relating to a result of the search request from the second computer (704) and may store the information in the active document (705). For example, front-end system 110 may receive a plurality of search results (such as those shown in search field 411 of FIG. 4), the user may select one of those results, and based on this selection front-end system 110 may store information in customer information field 321 of the active document. In some embodiments, the search request is sent from the first computer to the second computer as a message according to the Simple Object Access Protocol (SOAP).

In some embodiments, a single link program located on the first computer supports any accesses by application programs on the first computer to the data objects on the second computer. In further embodiments, the single link program may be a single dynamic link library file. In some embodiments, each field in the active document may be matched to a web service. In some embodiments, the second computer forwards the search request to a third computer that has a local random access memory (RAM), and the third computer performs the search on data stored in its local RAM.

In some embodiments, the above process of entering data into the active document may continue until the user of the application program submits a request at the first computer requesting that the active document be submitted (706). If the user sends a request to submit the active document, then the active document may be forwarded from the first computer to the second computer (707), and the second computer may perform a set of predefined procedures on the active document (708). For example, the user may wish to submit a completed quotation document and may select a button to submit the quotation document, which may cause front-end system 110 to forward the completed quotation document to back-end system 130. Back-end system 130 may then perform a defined set of procedures with the completed quotation, such as storing the quotation as a data object in database 135 as an attachment or as a business object with link to the attachment, generating a report based on the quotation (e.g., to all relevant managers), sending the completed quotation as a letter or email to the intended recipient, etc.

Figure 8:
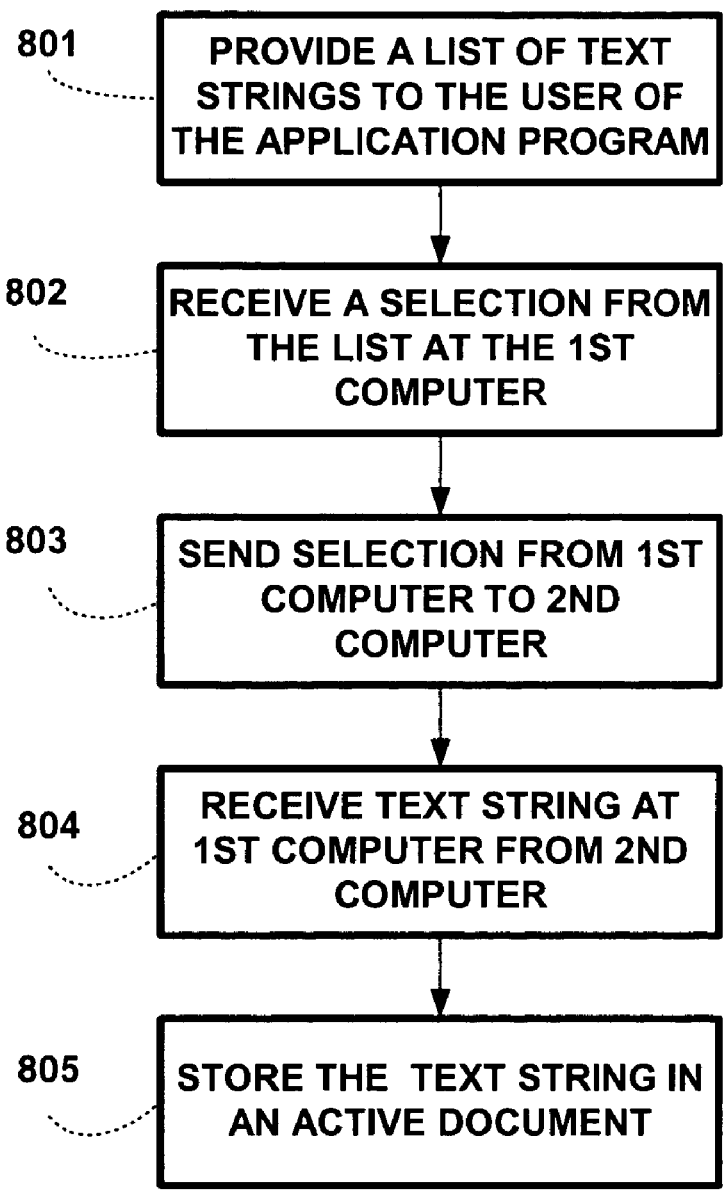
FIG. 8 is a simplified flow chart that shows a method of adding information to an active document as a text string from a back-end system according to an embodiment of the present invention.

FIG. 8 is a simplified flow chart that shows a method of adding information to an active document as a text string from a back-end system according to an embodiment of the present invention. This method may be performed, for example, as part of the method of FIG. 7 (e.g., prior to submitting the active document). According to the method shown in FIG. 8, a list of text strings may be provided to the user of an application program (801). For example, front-end system 110 may display a text snippet list as shown in FIG. 5. The first computer may receive an identification of a selection from the list (802) and may send the identification to the second computer (803). For example, the user may select the second text snippet shown in FIG. 5, and front-end system 110 may thus send an identification of the second text snippet to back-end system 130. The first computer may receive the selected text string from the second computer (804) and the first computer may store the selected text string in the active document (805). For example, the text string "We are glad to provide you . . . regarding our products" may be inserted into letter text field 322 of the active document as shown in FIGS. 5-6. In some embodiments, the text string may be stored at the second computer in a portal or document management system.

Figure 9:
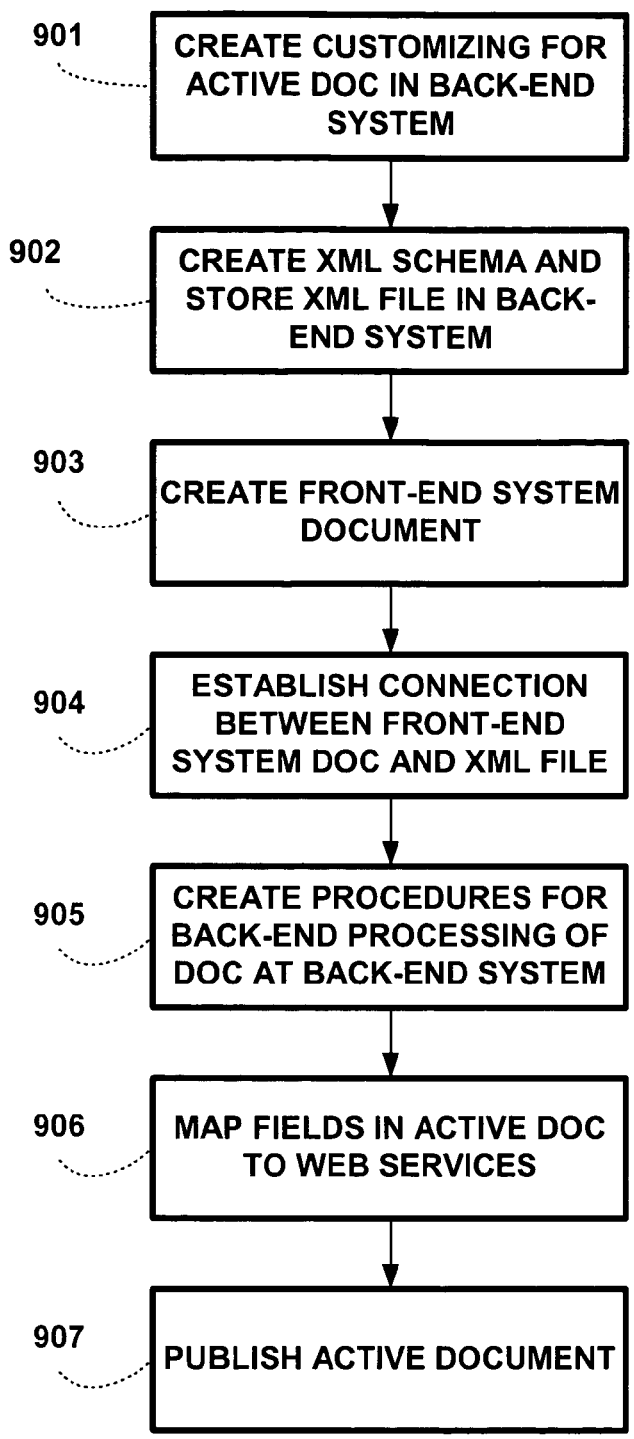
FIG. 9 is a simplified flow diagram of a process for generating active document forms according to an embodiment of the present invention.

FIG. 9 is a simplified flow diagram of a process for generating active document forms according to an embodiment of the present invention. For the purposes of illustration, this process is discussed with reference to the systems and forms shown above in FIGS. 1-6. A person who is developing the active document/form may design a form with the necessary active fields and functions, such as to retrieve the data and text snippets. In some embodiments, it may be possible to specify the document completely on a back-end system, such as Back-end system 130 of FIG. 1, and to perform operations on the document at a front-end system, such as and Front-end system 110. Documents may be specified as an Extensible Markup Language (XML) file and XML-Schema generated out of a business object models. The form developer may divide an active document into logical blocks and declare if a particular block is query-based block, such as shown in FIG. 3, or a text snippet block, such as shown in FIG. 5. In some embodiments, by using a Universal Resource Locator (URL) based file store it may be possible to use an document solution without a need for a local installation at the front-end system. In such embodiments, the active document may contain a path to a collection of files (e.g., a manifest) at the back-end system that are used to perform the active functions, and some or all of those files may be loaded at the front-end system at the time the active document is opened by an application program. A Dynamic Link Library (DLL) file may be used to provide the functionality on the attached-schema-document to retrieve data from a back-end system to fill up fields in the document.

In the embodiment shown in FIG. 9, the developer may cause customizing tables for the active document to be created in a back-end system, such as back-end system 130 (901). Entries in these tables may be later used for generating XML schemas. For example, one table may specify a key for the active document being defined and a Uniform Resource Identifier (URI) as the description for the active document schema; another table may store service modules and relevant queries; another table may describe the actions carried out in the form, such as searching and reading text snippets; another table may tell the text-reading function which texts should be available for selection; etc. Based on the customizing tables, an XML Schema may be created and may be stored as an attachment to the relevant active document definition in the back-end system (902). In some embodiments, an XML generator may be used to generate the XML based on customizing done in the back-end system. A document/form may then be created in a format that is recognized by an application executing on the front-end system, such as front-end system 110, and this document/form may later by used as a form on the front-end system (903). A connection may then be established at the front-end system between the front-end system document and the XML (904). For example, this connection may be stored as a path where the DLL can be found. The resulting active document may then be stored for further processing, for example, as a word processing file that contains a path to a collection of files. Guided procedures for back-end processing of the active document may then be created and stored on the back-end system (905), and the form fields may be mapped to the Web services (906). In an embodiment, the Web services allow the business logic at the back-end system to be split off from the user interface at the front-end system. Finally, this active document form may be published (907) so that uses may have access to the new active document. The method discussed above with reference to FIGS. 7-8 may then be performed with this active document.

The present invention provides a means of creating documents with business content on a front-end system, which itself does not have any business logic, and a means of moving this data into a back-end system so that the back-end system may initiate a business process. In some embodiments, there is only a single Dynamic Link Library which handles all active document related communication with the back-end system, regardless of which applications are using the active document or which active documents are used. The back-end system may perform such a search on a set of data that is cached in a memory and thus minimize access to databases on the back-end system.

The above is a detailed discussion of the certain embodiments. It may be understood that the examples discussed are for illustration purposes only and are not intended to limit the configuration to that shown. For example, the order of the steps performed may be varied where appropriate. It is of course intended that the scope of the claims may cover other embodiments than those described above and their equivalents.

What is claimed is:

1. A computer implemented method for submitting data to a back-end server comprising:
   at the back-end server, creating an Extensible Markup Language (XML) file from customizing tables, wherein entries of the customizing tables specify elements in the XML file including search actions;
   creating a document in a format recognized by an application program executing on a front-end system, wherein the document contains a plurality of fields to be filled by a user of the front-end system;
   establishing a connection between the document and the XML file;
   displaying the document in the application program executing at the front-end system, and displaying with the document a search window, the search window configured to accept a user input for a current active field and send a search request to the back-end server;
   receiving search criteria for the current active field at the front-end system from a user of the application program;
   sending the search criteria and an indication of the current active field from the front-end system to the back-end server;
   executing a search action stored in the XML file to search business objects on the back-end server for information items that match the indication of the current active field and the search criteria to generate matched information items;
   transmitting the matched information items to the front-end system;
   displaying the matched information items in the search window, wherein the search window is to display detailed information of a matched information item upon a selection by the user;
   receiving a command from the user to choose of one of the matched information items;
   transferring the chosen matched information item into the document at the current active field;
   receiving at the front-end system a request from the user to submit the document;
   forwarding the document from the front-end system to the back-end server; and
   performing a set of guided procedures with the submitted document at the back-end server.

2. The method of claim 1, wherein a single link program located on the front-end system supports any access by application programs on the front-end system to the data objects on the back-end server.

3. The method of claim 2, wherein the single link program is a single dynamic link library file.

4. The method of claim 3, wherein any software to perform functions on data objects at the back-end server is located at the back-end server.

5. The method of claim 1, wherein each field in the document is matched to a web service.

6. The method of claim 1, wherein the back-end server forwards the search request to a third computer that has a local random access memory (RAM), and the third computer performs the requested search on data stored in its local RAM.

7. The method of claim 1, wherein the search request is sent from the front-end system to the back-end server as a message according to the Simple Object Access Protocol (SOAP).

8. The method of claim 1, wherein for one field of the document, the data objects being searched are text strings.

9. The method of claim 1, wherein the guided procedures create back-end data objects from the submitted document without user having to logon the back-end server.

10. The method of claim 1, wherein the guided procedures create back-end data objects from the submitted document without user having to execute an application on the back-end server.

11. A non-transitory machine readable medium having embodied thereon instructions executable by a processor of back-end server to perform a method comprising:
    at the back-end server, creating an Extensible Markup Language (XML) file from customizing tables, wherein entries of the customizing tables specify elements in the XML file including search actions;
    creating a document in a format recognized by an application program executing on a front-end system, wherein the document contains a plurality of fields to be filled by a user of the front-end system;
    establishing a connection between the document and the XML file;
    displaying the document in the application program executing at the front-end system, and displaying with the document a search window, the search window configured to accept a user input for a current active field and send a search request to the back-end server;
    receiving search criteria for the current active field at the front-end system from a user of the application program;
    sending the search criteria and an indication of the current active field from the front-end system to the back-end server;
    executing a search action stored in the XML file to search business objects on the back-end server for information items that match the indication of the current active field and the search criteria to generate matched information items;
    transmitting the matched information items to the front-end system;
    displaying the matched information items in the search window, wherein the search window is to display detailed information about a matched information item upon a selection of the user;
    receiving a command from the user to choose of one of the matched information items;

transferring the chosen matched information item into the document at the current active field;

receiving at the front-end system a request from the user to submit the document;

forwarding the document from the front-end system to the back-end server; and performing a set of guided procedures with the submitted document at the back-end server.

12. The non-transitory machine readable medium of claim 11, wherein a single link program located on the first computer supports any access by application programs on the first computer to the data objects on the back-end server.

13. The non-transitory machine readable medium of claim 12, wherein the single link program is a single dynamic link library file.

14. The non-transitory machine readable medium of claim 11, wherein any software to perform functions on data objects at the back-end server is located at the back-end server.

15. A computer implemented method for submitting data from a front-end system to a back-end system, the method comprising:

receiving a request at the back-end system, the request being sent from the front-end system and relating to a field of a document, the document being opened by an application program executing at the front-end system and containing a plurality of fields;

executing a function stored in an Extensible Markup Language (XML) file located at the back-end system in response to the request, wherein the XML file is created from entries of a plurality of customizing tables on the back-end system and is connected to the document by an established connection, the executed function searches data objects maintained by the back-end system with the request, sending a search result to the front-end system, the search result including a list of data items matching the request, wherein the application program executing at the front-system displays the list of data items to a user, and upon a selection by the user, displays detailed information for a respective selected data item, the user fills in the field of the document by choosing a data item from the search result;

repeating the above receiving, searching and sending steps until all fields of the document being filled and the document being completed;

receiving the document being submitted from the front-end system to the back-end system; and performing a set of procedures with the submitted document at the back-end system, wherein the procedures are pre-defined for the submitted document.

16. The method of claim 15, wherein a field in the document is either a query-based field or a text snippet field.

17. The method of claim 15, wherein the front-end system cannot perform functions that modify data objects at the back-end system.

18. The method of claim 15, wherein the document is in a word processor format.

19. The method of claim 15, wherein the established connection between the Extensible Markup Language file and the fields of the document is stored at the front-end system as a Dynamic Link Library file.

20. The method of claim 19, wherein the front-end system contains a single Dynamic Link Library file for any documents stored at the front-end system.

21. The method of claim 15, wherein the request is sent from the front-end system to the back-end system as a message according to the Simple Object Access Protocol (SOAP).

22. The method of claim 15, wherein the method further comprises mapping fields in the document to Web services.

23. The method of claim 15, wherein the procedures create back-end data objects from the submitted document without user having to logon the back-end system.

24. The method of claim 15, wherein the procedures create back-end data objects from the submitted document without user having to execute an application on the back-end system.

* * * * *